Feb. 13, 1951 L. P. FRIEDER ET AL 2,541,509
MECHANICAL RELEASE
Filed Jan. 30, 1946

INVENTORS
LEONARD P. FRIEDER
WALTER S. FINKEN
BY
Ernst D. Givin
ATTORNEY

Patented Feb. 13, 1951

2,541,509

UNITED STATES PATENT OFFICE 2,541,509

MECHANICAL RELEASE

Leonard P. Frieder, Great Neck, and Walter S. Finken, Brooklyn, N. Y., assignors, by direct and mesne assignments, to Reconstruction Finance Corporation, Philadelphia, Pa., a corporation of the United States Application January 30, 1946, Serial No. 644,310

10 Claims. (Cl. 294—83)

This invention relates generally to devices for connecting and disconnecting parachutes and their loads and has particular reference to improvements in devices of the character mentioned which will automatically disconnect the parachute and load as soon as the parachute has performed its function.

In most operations it is important that the parachute be set free as soon as the load has been grounded as otherwise the parachute might drag the load along the ground or over ice on lakes and streams. This is of extreme importance when parachutes are used in mining enemy waters or dropping torpedoes from an airplane. Even if mines are not drawn by the sail of the parachute away from the intended location, the sail might serve as a marker helping an enemy to locate the mines and in the case of torpedoes, if the parachutes are not disconnected as soon as the torpedo hits the water the parachute will act as a sea anchor or drag preventing the torpedo from making its run.

In the present application the invention is shown and described in the form it would take when launching torpedoes from an airplane. As will be clearly apparent later on, however, the invention is capable of other uses, some of which have been suggested above, and it is not the desire to exclude any of them as it is merely a matter of making minor changes to adapt the invention to use in dropping substantially any kind of a load.

A main object of the invention is to provide an apparatus which will securely maintain the connection between the parachute and its load while the parachute is lowering the load and which will unfailingly function automatically to disconnect the parachute from the load immediately upon grounding of the load. The term "grounding" is intended to cover broadly checking or arresting, even momentarily, the momentum of the load regardless of whether it strikes land, water, buildings, ships or anything else upon which the load might land.

Another object is to provide an apparatus of the character stated which is simple and sturdy in construction, which can be manufactured at a low cost, which can be easily operated manually to make the connection between the parachute and load, and which will function at any angle to make the disconnection when the momentum of the dropped load is checked.

With the foregoing and other objects in view the invention consists in a novel construction and relative arrangement of parts as hereinafter described in detail with references to the drawing accompanying and illustrating the description, the novel features of the invention being pointed out in claims appended hereto.

Figure 1:
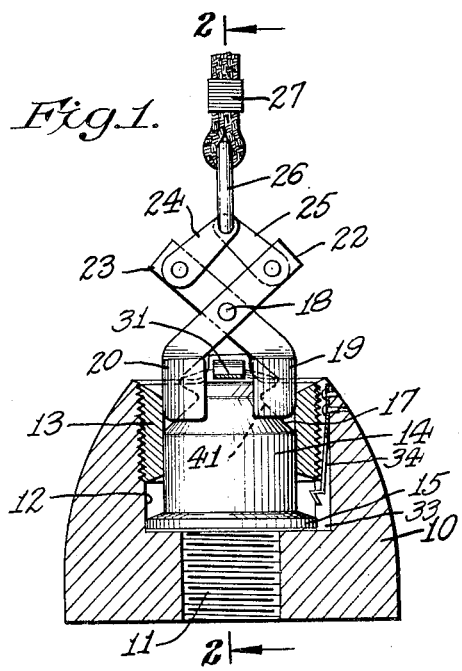
Fig. 1 is a side elevation of one of the devices with some of the parts in cross-section to expose others to view.

In the embodiment of the invention illustrated in the drawings the device is shown in connection with the propeller nut 10 of a torpedo, the nut being threaded as at 11, for installation on a propeller shaft. The nut is constructed to provide an internal bore 12 threaded to cooperate with threads on a bushing 13. Slidably mounted in the bore 12 is a piston 14 having an enlargement 15 at its lower end cooperating with the bushing 13 and the bottom of the bore 12 to limit the in and out movements of the piston.

The top of the piston is constructed to provide a knob 16 and an inclined surface 17. The knob 16 constitutes a member on the load which cooperates with other parts of the mechanism in attaching and disconnecting the load and the parachute.

Cooperating with the knob 16 is a pair of members pivoted together as at 18, the members below the pivot being constructed to provide jaws 19 and 20 which are so shaped on their interior as to conform to the contours of the knob and the inclined portion 17 on the piston when the jaws are closed. The free arms of the members 22 and 23 are pivoted to links 24 and 25 and the free ends of those links are pivotally connected by a load ring 26 or corresponding connection to the shroud lines 27 of the parachute.

Figure 2:
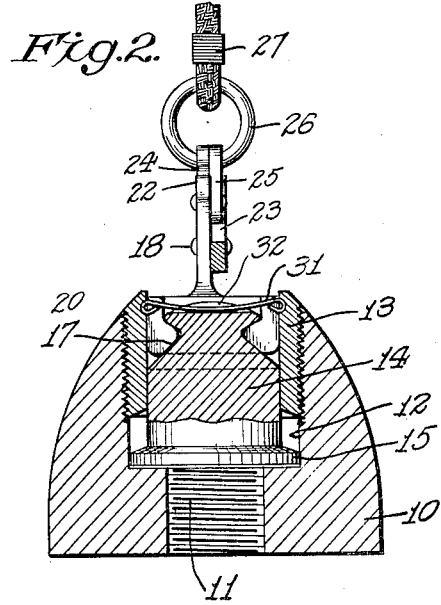
Fig. 2 is a section along the line 2—2 of Fig. 1.

In preparing the device for use the jaws 19 and 20 are closed on the knob 16 and the piston 14 and jaws are then pushed as a unit into the bore 12, this position of the parts being shown in Figs. 1 and 2. In that position the jaws are held in firm contact with the knob 16 by engagement with the interior wall of the bushing 13. In order to hold the parts against accidental disturbance a snap spring 31 has looped ends engaging notches or a groove in the bushing 13, the spring when snapped into position being seated in a groove 32 across the top of the knob 16.

Figure 3:
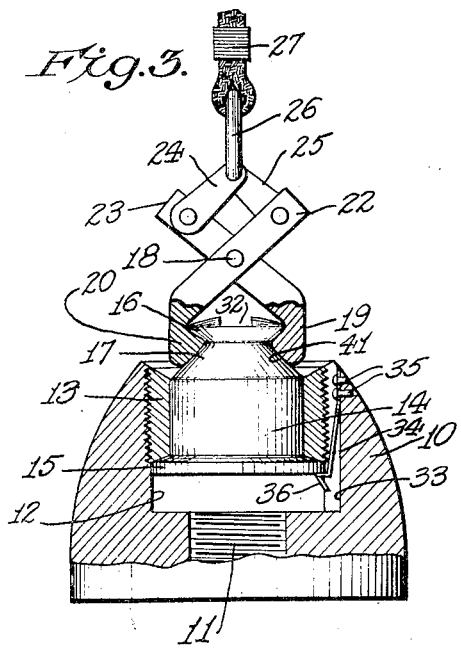
Figs. 3 and 4 are views of the apparatus, partly in cross-section, illustrating successive steps in the operation of the device.
Figure 4:
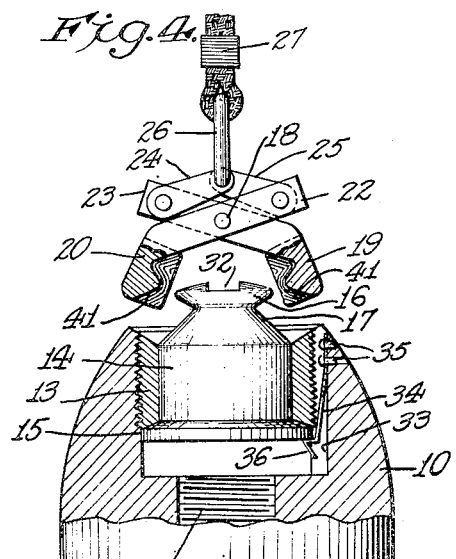

When the parachute assumes support of the torpedo the bow of the snap spring 31 is reversed and the spring kicked out by outward movement of the piston 14 to the position in which it is shown in Figs. 3 and 4. The piston is moved to that position by the toggle linkage 24 and 25 acting through the arms 22 and 23 and the jaws 19 and 20, the moving force, of course, being the stress between the load ring 26 and the load which is, in this embodiment, represented by the propeller shaft nut 10.

The piston 14 may have a fit in the cylinder bore which is loose enough to prevent retarding of the piston by a vacuum or air cushion effect, but it is preferred to have a fairly close fit between the piston and the bushing 13 and between the enlargement 15 on the piston and the cylinder wall and a vertical groove 33 in the cylinder wall which serves to prevent the vacuum or air cushion effect just mentioned. A detent spring 34 is secured by rivets 35 in the groove, the lower end of the spring being shaped as at 36 to catch under the bottom of the piston 14 when the piston is drawn to its outer position. This is to insure against a partial return of the piston to its inner position which might interfere with the automatic release. Instead of a sharp angle as shown on the spring catching under the bottom of the piston the spring might be shaped so that a firm pressure on the top of the piston would move the spring aside enough to permit forcing the piston to its inner position.

From all of the foregoing it is believed to be clear that when the parachute assumes support of the load the parts will be in the positions in which they are shown in Fig. 3.

When the load is grounded the jaws 19 and 20 are opened as shown in Fig. 4 to disengage them from the knob 16. This opening or spreading of the jaws is facilitated by the movement of the toggle links 24 and 25 due to their momentum, assisted to some extent by a sort of a camming movement between the portions 41 on the interiors of the jaws against the inclined surface 17 on the piston, the jaws having enough mass or weight to facilitate this camming movement. When the jaws are opened the portions 41 therein will also serve in cooperation with the top of the knob 16 to insure against accidental reengagement of the jaws with the knob. If the load should be tilted so that one of the jaws is not fully disengaged from the knob 16 the surfaces 41 in the other jaw will cooperate with the top of the knob 16 to insure freeing the knob from the other jaw.

While the invention has been described in detail with reference to a particular embodiment it is obvious that changes can be made to adapt it to other embodiments, and it is not the intention to be limited by anything hereinabove contained except to the extent indicated in the claims which follow.

What is claimed is:

1. A device of the character described comprising a member attached directly and rigidly to the load constructed to provide a cylinder bore, a piston movable to limited extents in and out of said bore, a knob on the outer end of said piston, a pair of tongs constructed to partially surround and engage said knob, said tongs being held in engagement with the knob by the piston bore when the piston is in its innermost position, a parachute load ring, and means intermediate the load ring and the tongs for causing the tongs to draw the piston to an outer position when the parachute assumes support of the load, said means opening the tongs when the load has been grounded.

2. An apparatus for connecting and disconnecting a parachute and a load comprising a member on the load constructed to provide an internal bore, a piston movable to limited extents in and out of said bore constructed to provide a knob on its outer end, a spring removably held at its ends by notches in the wall of said bore and extending across said knob to hold the piston against accidental outward movement, said spring being dislodged when the piston is drawn outward, a pair of members pivoted together intermediate their ends and constructed to provide jaws below the pivot point for engaging the piston knob and diverging arms above said pivot point, a link pivoted at one end to each of said arms, and a parachute load ring pivotally connecting the other ends of said links and movable to release the jaws from the piston knob when the piston is in its outer position.

3. An apparatus for connecting and disconnecting a parachute and a load comprising a member attached directly to the load constructed to provide an internal bore, a piston movable to limited extents in and out of said bore, a knob on the outer end of the piston, a pair of tongs having jaws constructed to provide inner faces to partially surround and engage said knob and outer faces cooperating with said bore to hold said inner faces in engagement with the knob when the piston is in its innermost position, means connecting the tongs to the parachute constructed to hold the jaws in engagement with the piston knob when the piston is drawn to its outer position to clear the jaws from restraint by said bore, said means being also so constructed as to spread the jaws to disengage the piston knob when the load is grounded.

4. An apparatus for connecting and disconnecting a parachute and a load comprising a member attached directly to the load constructed to provide an internal bore, a piston movable to limited extents in and out of said bore, a knob on the outer end of the piston, a pair of tongs having jaws constructed to provide inner faces to partially surround and engage said knob and outer faces cooperating with said bore to hold said inner faces in engagement with the knob when the piston is in its innermost position, means connecting the tongs to the parachute constructed to hold the jaws in engagement with the piston knob when the piston is drawn to its outer position to clear the jaws from restraint by said bore, said means being also so constructed as to spread the jaws to disengage the piston knob when the load is grounded, and detent means brought into engagement with the piston upon outward movement thereof, for holding the piston in its outer position.

5. An apparatus such as is specified in claim 3 in which the piston knob and the engaged jaws are held against unintentional disengagement by a detent normally holding the piston and said jaws within the confines of the internal bore, said detent being disabled by outward movement of the piston.

6. An apparatus for connecting and disconnecting a parachute and a load comprising a member on the load constructed to provide an internal cylinder, a piston movable to limited extents in and out of said cylinder, a knob on the outer end of said cylinder, a pair of members pivoted together at a point intermediate their ends constructed to provide jaws below said pivot point for engaging said knob and diverging arms above said point, said jaws being held in engagement with said knob by the wall of the cylinder when the piston is in its inner position, linkage connecting the arms of said members to the parachute in such manner that the piston is drawn to its outer position and said jaws are held in engagement with the piston knob when the parachute assumes support of the load, said linkage comprising a pair of links pivoted at opposite ends respectively to said arms and pivoted together at their ends on a single, rigid axis, said linkage thereby being movable to disengage said jaws from said knob when the momentum of the load is arrested by grounding of the load.

7. A device of the character described comprising a member directly attached to the load constructed to provide a tubular recess, a piston movable to limited extents to and fro in said recess and constructed to provide a knob on its outer end, a snap spring held at its ends by notches in the wall of said recess and engaging the upper surface of the knob to hold the piston against accidental outward movement, a pair of members pivoted together at a point about half the distance between their ends whereby to provide a pair of arms above and a pair of jaws below the pivot constructed to grasp the knob on the piston, a link pivoted at one end to the outer end of each of said arms, and a parachute load ring connecting the free ends of said links whereby load stress applied between said links and the load ring when the parachute opens will cause the knob grasping jaws to draw the piston to its outermost position and relief of said stress by grounding of the load will cause movement of the links and members to disengage the jaws from the knob on the piston.

8. A device of the character described comprising a member constructed to provide a cylinder bore, a piston movable to limited extents in and out of said bore, a knob on the outer end of said piston, a pair of tongs constructed to partially surround and engage said knob, said tongs being held in engagement with the knob by the piston bore when the piston is in its innermost position, a connecting member, one of said members being connected to a load and the other of said members being connected to a parachute line, means intermediate the connecting member and the tongs for causing the tongs to draw the piston to an outer position when the parachute assumes support of the load, said means cooperating with the tongs for opening movement of the tongs when the load has been grounded, and means brought into operation when the piston is drawn to said outer position for holding the piston in said outer position to insure the aforesaid opening of the tongs.

9. An apparatus for connecting and disconnecting a parachute and a load comprising a member attached directly to the load constructed to provide an internal bore, a piston movable to limited extents in and out of said bore, a knob on the outer end of the piston, a pair of tongs having jaws constructed to provide inner faces to partially surround and engage said knob and outer faces cooperating with said bore to hold said inner faces in engagement with the knob when the piston is in its innermost position, means connecting the tongs to the parachute constructed to hold the jaws in engagement with the piston knob when the piston is drawn to its outer position to clear the jaws from restraint by said bore, said means being also so constructed as to spread the jaws to disengage the piston knob when the load is grounded, said tongs being pivoted on a common axis and having respective tail portions extending beyond and outwardly from said pivot axis, and said last-mentioned connecting means comprising a pair of links respectively pivoted at their outer ends to the aforesaid tail portions and means, connected to the parachute, pivoting the links together at their inner ends on another, common axis so that relative to each other, said inner ends of the links may move only angularly about said last-mentioned axis.

10. A device for releasably securing a load to a support by which the load is lowered, comprising a cylinder member, a support member, one of said members being attached to the load and the other of said members being attached to the support, a piston member reciprocably sliding in the cylinder member to and from an inner position, said cylinder member being open toward said support member, and said piston and cylinder members having stop means limiting outward movement of the piston member toward the support member at a predetermined outer position, and a pair of jaw elements pivotally connected to one of said support and piston members to swing relative to each other and having respective jaw ends adapted to engage and hold the other of said support and piston members when said jaw ends are swung toward each other, said jaw elements being disposed relative to said cylinder and piston members so that when the piston member is in its inner position said jaw ends are within said cylinder member and the jaw elements are restrained by the latter from swinging out of the aforesaid engagement, and so that when the piston member is drawn to the outer position upon exertion of load force between the support and cylinder members said jaw elements are then disposed entirely outside of the cylinder member, said jaw elements and their jaw ends being shaped relative to the aforesaid pivotal connection so that with the piston in said outer position the jaw ends are pulled toward and retained in said holding engagement by exertion of the aforesaid load force between the pivotal connection and the jaw ends, and means adapted to act on said jaw elements in response to relief of said load force, for swinging the jaw ends away from each other and out of the aforesaid holding engagement, so as thereby to separate the load from the support when descent of the load is arrested.

LEONARD P. FRIEDER.
WALTER S. FINKEN.

REFERENCES CITED

The following references are of record ni the file of this patent:

UNITED STATES PATENTS

| Number | Name | Date |
|---|---|---|
| 2,400,165 | Porter | May 14, 1946 |